United States Patent
Kishi

(10) Patent No.: US 11,563,226 B2
(45) Date of Patent: Jan. 24, 2023

(54) MEMBRANE-ELECTRODE ASSEMBLY AND POLYMER ELECTROLYTE FUEL CELL

(71) Applicant: TOPPAN PRINTING CO., LTD., Tokyo (JP)

(72) Inventor: Katsuyuki Kishi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 237 days.

(21) Appl. No.: 16/944,508

(22) Filed: Jul. 31, 2020

(65) Prior Publication Data

US 2020/0365922 A1 Nov. 19, 2020

Related U.S. Application Data

(63) Continuation of application No. PCT/JP2019/002090, filed on Jan. 23, 2019.

(30) Foreign Application Priority Data

Feb. 2, 2018 (JP) ................. JP2018-017533

(51) Int. Cl.
*H01M 8/1004* (2016.01)
*H01M 4/86* (2006.01)
(Continued)

(52) U.S. Cl.
CPC ....... *H01M 8/1004* (2013.01); *H01M 4/8673* (2013.01); *H01M 8/1018* (2013.01); *H01M 2008/1095* (2013.01)

(58) Field of Classification Search
CPC ............ H01M 8/1004; H01M 4/8673; H01M 8/1018; H01M 2008/1095
See application file for complete search history.

(56) References Cited

U.S. PATENT DOCUMENTS

2004/0197638 A1 10/2004 McElrath et al.
2010/0291467 A1* 11/2010 Ji ..................... H01M 4/8817
977/700

(Continued)

FOREIGN PATENT DOCUMENTS

JP 2005-032535 A 2/2005
JP 2005-141966 A 6/2005
(Continued)

OTHER PUBLICATIONS

International Searching Authority, "International Search Report," issued in connection with International Patent Application No. PCT/JP2019/002090, dated Apr. 16, 2019.

(Continued)

*Primary Examiner* — Stewart A Fraser
(74) *Attorney, Agent, or Firm* — Foley & Lardner LLP

(57) ABSTRACT

A membrane-electrode assembly including a polymer electrolyte membrane, and electrocatalyst layers disposed on both surfaces of the polymer electrolyte membrane, with a total light transmittance measured after delamination of both the electrocatalyst layers by using an adhesive member is 40% or less. The total light transmittance is at an electrocatalyst layer located part, when a total light transmittance at an electrocatalyst layer non-located part is taken to be 100%. The viscous member has an adhesive force of 3 N/10 mm or more when measured by pulling the viscous member adhered to a stainless steel in a 180°angle direction relative to the stainless steel, for delamination from the stainless steel.

4 Claims, 2 Drawing Sheets

(51) Int. Cl.
*H01M 8/1018* (2016.01)
*H01M 8/10* (2016.01)

(56) References Cited

U.S. PATENT DOCUMENTS

| | | | | |
|---|---|---|---|---|
| 2013/0157163 A1* | 6/2013 | Nanba | ........................ | C25B 9/23 |
| | | | | 156/247 |
| 2013/0196254 A1* | 8/2013 | Uehara | ............... | H01M 8/0286 |
| | | | | 429/535 |
| 2020/0044271 A1* | 2/2020 | Kim | .................... | H01M 8/1067 |

FOREIGN PATENT DOCUMENTS

| | | |
|---|---|---|
| JP | 2007-188741 A | 7/2007 |
| JP | 2007-234473 A | 9/2007 |
| JP | 2008-122330 A | 5/2008 |
| JP | 2008-192329 A | 8/2008 |
| JP | 2009-181949 A | 8/2009 |
| JP | 2010-049931 A | 3/2010 |

OTHER PUBLICATIONS

International Searching Authority, "Written Opinion," issued in connection with International Patent Application No. PCT/JP2019/002090, dated Apr. 16, 2019.
Extended European Search Report dated Feb. 18, 2021 for corresponding European Patent Application No. 19748117.9.

* cited by examiner

# MEMBRANE-ELECTRODE ASSEMBLY AND POLYMER ELECTROLYTE FUEL CELL

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2019/002090, filed on Jan. 23, 2019, which is based upon and claims the benefit of priority to Japanese Patent Application No. 2018-017533, filed on Feb. 2, 2018; the disclosures of which are all incorporated herein by reference in their entireties.

BACKGROUND

Technical Field

The present invention relates to a membrane-electrode assembly for a polymer electrolyte fuel cell, and a polymer electrolyte fuel cell.

Background Art

Polymer electrolyte fuel cells include a membrane-electrode assembly in which electrocatalyst layers are disposed on both surfaces of a polymer electrolyte membrane. Fuel cells are desired to have stable and improved power generation performance for cost reduction. To achieve stable and improved power generation performance, adhesion between the polymer electrolyte membrane and each electrocatalyst layer is required to be improved to facilitate mass transfer such as of protons or water at the interface between the polymer electrolyte membrane and the electrocatalyst layer.

Patent Literatures 1 and 2 each disclose a membrane-electrode assembly defining 90° peeling strength at the interface between a polymer electrolyte membrane and each electrocatalyst layer. According to these literatures, a 90° peeling strength of not less than the limited value can achieve stable power generation performance in a membrane-electrode assembly.

[Citation List] [Patent Literature] Patent Literature 1: JP 2008-192329 A; Patent Literature 2: JP 2008-122330 A.

SUMMARY OF THE INVENTION

Summary of the Invention

Technical Problem

However, electrocatalyst layers are brittle and tend to cause cohesive fracture when delaminated. Therefore, electrocatalyst layers are damaged before being completely delaminated from the polymer electrode membrane. Accordingly, it has been difficult to correctly evaluate the 90° peeling strength at the interface between a polymer electrolyte membrane and an electrocatalyst layer.

The present invention has been made under the circumstances mentioned above and aims to provide a membrane-electrode assembly for a polymer electrolyte fuel cell, which achieves good adhesion between a polymer electrode membrane and electrocatalyst layers and stable and improved power generation performance, and aims to provide a polymer electrolyte fuel cell.

Solution to Problem

A membrane-electrode assembly according to an aspect of the present invention includes a polymer electrolyte membrane, and electrocatalyst layers disposed on both surfaces of the polymer electrolyte membrane. In the assembly, a total light transmittance measured after delamination of both the electrocatalyst layers by using an adhesive member is 40% or less; the total light transmittance is a total light transmittance at a part where the electrocatalyst layers are located, when a total light transmittance at a part other than the part where the electrocatalyst layers are located is taken to be 100%; and the adhesive member has an adhesive force of 3 N/10 mm or more when measured by pulling the adhesive member adhered to a stainless steel in a 180°-angle direction relative to the stainless steel, for delamination from the stainless steel.

A polymer electrolyte fuel cell according to another aspect of the present invention includes the membrane-electrode assembly according to the aspect set forth above.

Advantageous Effects of the Invention

The present invention can provide a membrane-electrode assembly which achieves good adhesion between a polymer electrolyte membrane and electrocatalyst layers, and enables stable and improved power generation performance.

BRIEF DESCRIPTION OF THE DRAWINGS

Brief Description of the Drawings

Figure 1:
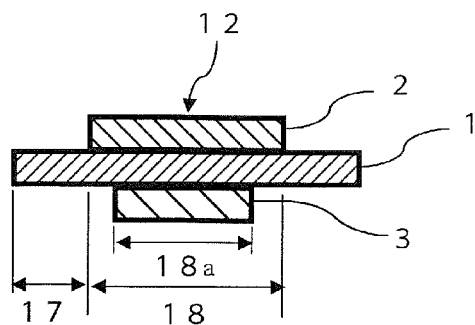

FIG. 1 is a cross-sectional view illustrating a structure of a membrane-electrode assembly according to an embodiment of the present invention.

Figure 2A:
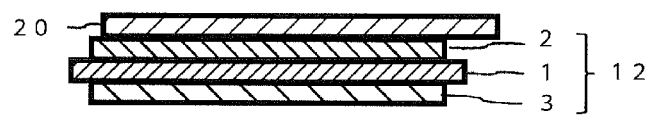
Figure 2B:
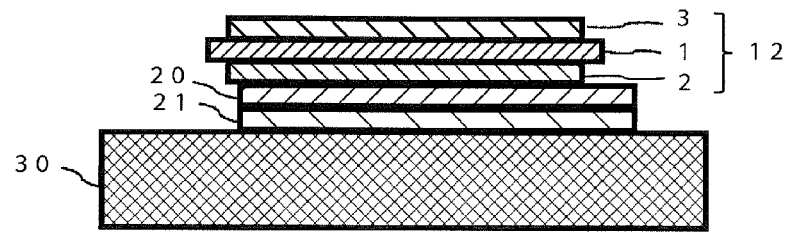
Figure 2C:
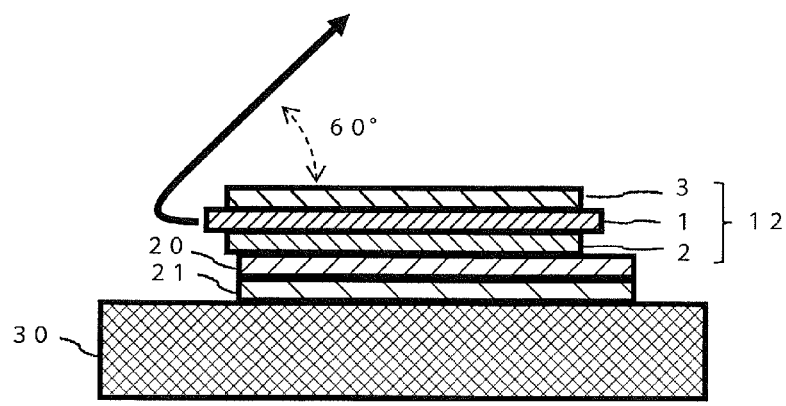

FIGS. 2(a), 2(b), and 2(c) are a set of diagrams illustrating a method of delaminating electrocatalyst layers by using an adhesive member.

Figure 3:
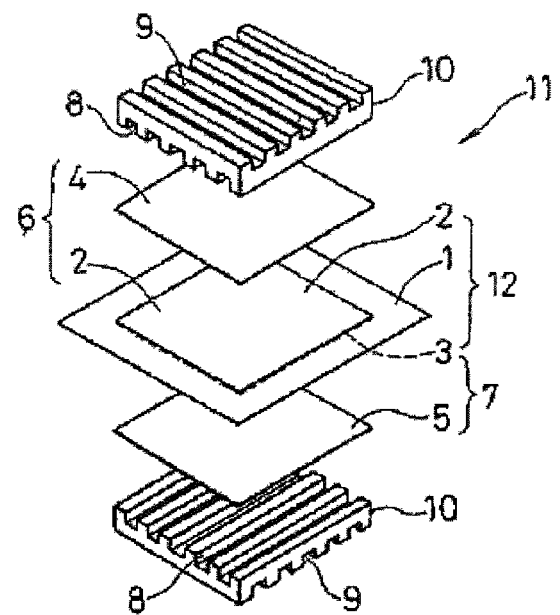

FIG. 3 is an exploded perspective view illustrating an internal structure of a cell unit of a polymer electrolyte fuel cell according to an embodiment of the present invention.

Figure 4:
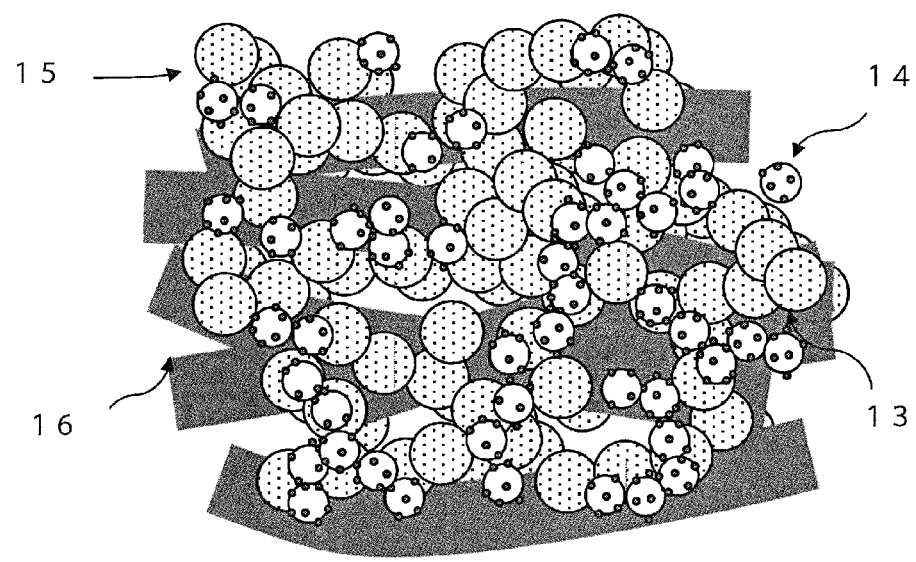

FIG. 4 is a schematic diagram illustrating a structure of an electrocatalyst layer of a membrane-electrode assembly according to an embodiment of the present invention.

DETAILED DESCRIPTION

Embodiments of the present invention will be described below with reference to the drawings. In the following description of the drawings to be referred, components identical with or similar to each other are given the same or similar reference signs. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims.

(Membrane-Electrode Assembly)

As shown in FIG. 1, a membrane-electrode assembly 12 according to an embodiment of the present invention (termed the present embodiment hereinafter) has a structure including a polymer electrode membrane 1, a cathode-side electrocatalyst layer 2 formed on one surface of the polymer electrolyte membrane 1 and an anode-side electrocatalyst layer 3 formed on the other surface of the polymer electrolyte membrane 1.

The membrane-electrode assembly 12 can be defined to be a part 18 where the electrocatalyst layers 2 and 3 are located (termed an electrocatalyst layer located part 18 hereinafter) and a part 17 where the electrocatalyst layers 2 and 3 are not located (termed an electrocatalyst layer non-located part 17 hereinafter). After delaminating the electrocatalyst layers 2 and 3 by using an adhesive member, the electrocatalyst layer located part 18 of the membrane-electrode assembly 12 is preferred to have a total light transmittance of 40% or less, and more preferably 20% or less. It should be noted that the total light transmittance is a value (relative value) when the total light transmittance at the electrocatalyst layer non-located part 17 is taken to be 100%. If the electrocatalyst layers 2 and 3 have areas different from each other, the total light transmittance at a part 18a is used where the electrocatalyst layers commonly face each other on both sides of the polymer electrolyte membrane.

The total light transmittance of the electrocatalyst layer located part 18 being 40% or less means that the electrocatalyst layers 2 and 3 partially remain on the surface of the polymer electrolyte membrane after being delaminated. Accordingly, such a membrane-electrode assembly 12 exerts good adhesion between the polymer electrolyte membrane 1 and the electrocatalyst layers 2 and 3. Thus, a polymer electrolyte fuel cell produced using the membrane-electrode assembly 12 can achieve high and stable power generation performance.

[Method of Delaminating Electrocatalyst Layer]

The following description explains a method of delaminating the electrocatalyst layers 2 and 3 by using an adhesive member. In the example provided below, a single-sided adhesive tape is used as an example of an adhesive member. However, the adhesive member is not limited to this.

(Step 1) As shown in FIG. 2(a), a single-sided adhesive tape 20 is adhered to one surface of the electrocatalyst layer 2 of the membrane-electrode assembly 12 and rubbed firmly with the fingertips. The single-sided adhesive tape 20 is preferred to be transparent so that the entire adhesion can be confirmed. It is also preferred that the tape is not adhered to surfaces other than the surface of the electrocatalyst layer 2 so that the tape can be easily separated. It should be noted that the single-sided adhesive tape 20 used herein is a tape according to the Industrial Standardization Act (JIS K 5600-5-6).

(Step 2) As shown in FIG. 2(b), the single-sided adhesive tape side of the membrane-electrode assembly 12 is fixed on a flat surface of a fixing base 30 via a double-sided adhesive tape 21. Any member, such as a workbench or metal plate, may be used as the fixing base 30 as long as the member can continuously fix the membrane-electrode assembly 12 during delamination. It should be noted that the double-sided adhesive tape 21 used herein is required to have an adhesive force equal to or more than that of the single-sided adhesive tape 20.

(Step 3) As shown in FIG. 2(c), the polymer electrolyte membrane 1 of the membrane-electrode assembly 12 is pulled at an angle as close as possible to 60° relative to the flat surface of the fixing base 30 and consistently delaminated from the electrocatalyst layer 2 within 0.5 seconds or more and 1.0 second or less.

(Step 4) The electrocatalyst layer 3 opposite to the delaminated electrocatalyst layer 2 is also delaminated by applying the same procedure as in steps 1 to 3.

The single-sided adhesive tape 20 is preferred to have an adhesive force stronger than the adhesive force at the interface between the polymer electrolyte membrane 1 and the electrocatalyst layer 2 or 3 because the electrocatalyst layer 2 or 3 alone can be delaminated in this adhesive force relationship. The adhesive force of the single-sided adhesive tape 20 is measured by adhering it to a stainless steel plate and pulling it at an angle of 180° relative to the stainless steel plate for delamination therefrom (180° peeling strength). The adhesive force in this case is preferred to be 3 N/10 mm or more.

[Method of Measuring Total Light Transmittance]

A total light transmittance is measured in a thickness direction by using a haze meter. The total light transmittance at the electrocatalyst layer non-located part 17 is measured and the measured value is used as a reference value (100%). Next, the sample prepared through steps 1 to 4 is loaded on the haze meter so that the electrocatalyst layer located part 18 is positioned in the measurement range to measure the total light transmittance of the electrocatalyst layer located part 18. The total light transmittance of the electrocatalyst layer located part 18 is measured three times by changing positions and an average of the measurements is taken to be the total light transmittance of the electrocatalyst layer located part 18.

(Polymer Electrolyte Fuel Cell)

As shown in FIG. 3, the cathode-side electrocatalyst layer 2 and the anode-side electrocatalyst layer 3 of the membrane-electrode assembly 12 respectively face an air electrode-side gas diffusion layer 4 and a fuel electrode-side gas diffusion layer 5. Thus, the cathode-side electrocatalyst layer 2 and the air electrode-side gas diffusion layer 4 configure an air electrode 6, while the anode-side electrocatalyst layer 3 and the fuel electrode-side gas diffusion layer 5 configure a fuel electrode 7.

The air electrode 6 and the fuel electrode 7 are sandwiched and held between a pair of separators 10, 10 to configure a cell unit of the polymer electrolyte fuel cell 11. The separators 10 are made of an electrically conductive and gas impermeable material and each include a gas passage 8 for passing a reactive gas, which is disposed on a surface facing the air electrode-side gas diffusion layer 4 or the fuel electrode-side gas diffusion layer 5, and a cooling water passage 9 for passing cooling water, which is disposed on a main surface facing away from the surface where the gas passage 8 is disposed.

In the polymer electrolyte fuel cell 11, an oxidant, such as air or oxygen, is supplied to the air electrode 6 via the gas passage 8 of one separator 10, while a fuel gas comprising hydrogen or an organic fuel is supplied to the fuel electrode 7 via the gas passage 8 of the other separator 10 to thereby generate electrical power.

(Electrocatalyst Layer)

As shown in the cross-sectional view of FIG. 4, for example, the electrocatalyst layers 2 and 3 of the present embodiment each have a structure comprising catalyst particles 13, carbon particles 14, a polymer electrolyte 15 and carbon fibers 16.

Any material can be used for the polymer electrolyte 15 as long as the material has ion conductivity, but it is preferred that the same material as that of the polymer electrolyte membrane 1 is selected for the polymer electrolyte 15 considering adhesion between the electrocatalyst layer 2 or 3 and the polymer electrolyte membrane 1. For example, a fluorine or hydrocarbon resin may be used for the polymer electrolyte 15. An example of the fluorine resin may be Nafion (trademark) manufactured by DuPont de Nemours, Inc. The hydrocarbon resin may, for example, be a material obtained by introducing a sulfonic acid group into an engineering plastic material or a copolymer thereof.

As the catalyst particles 13, a platinum group element or metal, including an alloy or oxide thereof, or multiple oxide or the like may be used. The platinum group element may be platinum, palladium, ruthenium, iridium, rhodium or osmium. Examples of the metal may include iron, lead, copper, chromium, cobalt, nickel, manganese, vanadium, molybdenum, gallium and aluminum. Of these materials, platinum or a platinum alloy is preferred as the catalyst particles 13. The catalyst particles 13 are preferred to have a size in the range of 0.5 nm or more and 20 or less, and more preferably in the range of 1 nm or more and 5 nm or less. This is because an excessively large particle size may make the catalyst particles 13 less active, and an excessively small particle size may make the catalyst particles 13 less stable.

Any carbon particles may be used for the carbon particles 14 as long as they are microparticles and electrically conductive, and are not affected by the catalyst particles 13. If the carbon particles 14 have an excessively small size, an electron conduction path is less likely to be formed, or if they have an excessively large size, the thickness of the electrocatalyst layer 2 or 3 may increase, which may lead to increase in resistance and accordingly may lead to deterioration in the output characteristics. Therefore, the size of the carbon particles 14 is preferred to be in the range of about 10 nm or more and 1,000 nm or less, and more preferably in the range of 10 nm or more and 100 nm or less.

The carbon particles 14 are preferred to support the catalyst particles 13. When the carbon particles 14 having a high surface area support the catalyst particles 13, the catalyst particles 13 can be supported with high density and the catalytic activity can be improved.

The electrocatalyst layers 2 and 3 may or may not comprise the carbon fibers 16. If the carbon fibers 16 are contained, the electrocatalyst layers 2 and 3 can be easily formed and mechanical strength thereof can be improved. In addition, power generation performance or durability of the membrane-electrode assembly 12 can be improved.

Examples of the carbon fibers 16 that can be used include carbon fibers, carbon nanofibers and carbon nanotubes. Carbon nanofibers or carbon nanotubes are preferred to be used.

The carbon fibers 16 are preferred to have a diameter in the range of 0.5 nm or more and 500 nm or less, and more preferably in the range of 10 nm or more and 300 nm or less. A diameter in the above range may increase voids in the electrocatalyst layers 2 and 3 and may achieve high output performance.

The carbon fibers 16 are preferred to have a length in the range of 1 µm or more and 200 µm or less, and more preferably in the range of 1 µm or more and 50 µm or less. A length in the above range may increase the strength of the electrocatalyst layers 2 and 3 and may minimize the occurrence of cracking when these layers are formed. The diameter in the above range may increase voids in the electrocatalyst layers 2 and 3 and may achieve high output performance.

The description so far has explained the case where the catalyst particles 13 are supported by the carbon particles 14. Alternatively, however, the catalyst particles 13 may be supported by the carbon fibers 16, or may be supported by both the carbon particles 14 and the carbon fibers 16. However, the state of the catalyst particles 13 supported by the carbon particles 14 is preferred because the gaps formed between the carbon fibers 16 may serve as discharge routes for the water produced by power generation and may improve drainage of the electrocatalyst layers 2 and 3.

The electrocatalyst layers 2 and 3 are each preferred to have a thickness of 30 µm or less, and more preferably 10 µm or less. If the thickness is more than 30 µm, the electrocatalyst layers 2 and 3 may have a high resistance and the power generation performance may be impaired accordingly. In addition, the electrocatalyst layers 2 and 3 may easily suffer from cracking.

The thickness of the electrocatalyst layers 2 and 3 is preferred to be 5 µm or more. If the thickness is less than 5 µm, thickness variation may easily occur in the layers, and the catalyst particles 13 and the polymer electrolyte 15 therein tend to be unevenly dispersed. Cracking on the surfaces of the electrocatalyst layers 2 and 3 or uneven thickness of these layers have a high probability of adversely affecting the durability of the fuel cell when driven over a long time. Therefore, a thickness of less than 5 µm is unfavorable. Furthermore, concentration of water produced due to power generation may tend to increase in the electrocatalyst layers 2 and 3 and thus flooding may easily occur, impairing the power generation performance. Therefore, a thickness of less than 5 µm is unfavorable.

(Method of Producing Electrocatalyst Layer)

The electrocatalyst layers 2 and 3 may each be produced by preparing a catalyst-layer slurry and applying the prepared catalyst-layer slurry to a substrate or the like, followed by drying. The catalyst-layer slurry comprises the catalyst particles 13, the carbon particles 14, the polymer electrolyte 15, the carbon fibers 16 and a solvent. The solvent is not particularly limited but is preferred to be a solvent that can disperse or dissolve the polymer electrolyte 15.

Examples of the solvent used may include water, alcohols such as methanol, ethanol, 1-propanol, 2-propanol, 1-butanol, 2-butanol, isobutyl alcohol and tert-butyl alcohol, and ketones such as acetone, methyl ethyl ketone, methyl propyl ketone, methyl butyl ketone, methyl isobutyl ketone, methyl amyl ketone, pentanone, heptanone, cyclohexanone, methylcyclohexanone, acetonylacetone, diethyl ketone, dipropyl ketone and diisobutyl ketone.

Other examples of the solvent may include ethers such as tetrahydrofuran, tetrahydropyran, dioxane, diethylene glycol dimethyl ether, anisole, methoxytoluene, diethyl ether, dipropyl ether and dibutyl ether, amines such as isopropylamine, butylamine, isobutylamine, cyclohexylamine, diethylamine and aniline, and esters such as propyl formate, isobutyl formate, amyl formate, methyl acetate, ethyl acetate, propyl acetate, butyl acetate, isobutyl acetate, pentyl acetate, isopentyl acetate, methyl propionate, ethyl propionate and butyl propionate.

Furthermore, acetic acid, propionic acid, dimethylformamide, dimethylacetamide, N-methylpyrrolidone or the like may be used as the solvent. Glycols or glycol ether solvents may include ethylene glycol, diethylene glycol, propylene glycol, ethylene glycol monomethylether, ethylene glycol dimethylether, ethylene glycol diethylether, diacetone alcohol, 1-methoxy-2-propanol and 1-ethoxy-2-propanol.

The method of applying the catalyst-layer slurry is not particularly limited but may be doctor blading, die coating, dipping, screen printing, laminator roll coating, spraying, or the like.

The method of drying the catalyst-layer slurry may be hot-air drying, IR (infrared) drying, or the like. The temperature of drying may be 40° C. or more and 200° C. or less, but is preferred to be about 40° C. or more and 120° C. or less. The time of drying may be 0.5 minutes or more and 1 hour or less, but is preferred to be about 1 minute or more and 30 minutes or less.

(Method of Producing Membrane-Electrode Assembly)

The method of producing the membrane-electrode assembly 12 may be a method in which electrocatalyst layers 2 and 3 are formed on transfer substrates or on the gas diffusion layers 4 and 5 and thermally pressed against the polymer electrolyte membrane 1 to thereby form the electrocatalyst layers 2 and 3 on the polymer electrolyte membrane 1, or a method in which electrocatalyst layers 2 and 3 are directly formed on the polymer electrolyte membrane 1. The method of directly forming electrocatalyst layers 2 and 3 on the polymer electrolyte membrane 1 is preferred because high adhesion is achieved between the polymer electrolyte membrane 1 and the electrocatalyst layers 2 and 3, and there is no risk of crushing the electrocatalyst layers 2 and 3.

As described above, in the membrane-electrode assembly 12 of the present embodiment, the total light transmittance at the electrocatalyst layer located part 18 is ensured to be 40% or less after delamination of the electrocatalyst layers 2 and 3 by using an adhesive member, such as an adhesive tape, when taking the total light transmittance at the electrocatalyst layer non-located part 17 to be 100%.

Such a configuration can achieve a membrane-electrode assembly 12 which provides good adhesion between the polymer electrolyte membrane 1 and the electrocatalyst layers 2 and 3, and enables stable and improved power generation performance. The membrane-electrode assembly 12 of the present embodiment is highly suitable for application, for example, to polymer electrolyte fuel cells.

EXAMPLES

Examples and comparative examples of the present invention will now be described.

[Method of Delaminating Electrocatalyst Layer]

Electrocatalyst layers were delaminated according to the delamination method described above. Cellotape (trademark) manufactured by Nichiban Co., Ltd. was used as a single-sided adhesive tape 20. Nicetack (trademark) manufactured by Nichiban Co., Ltd. was used as a double-sided adhesive tape 21. The single-sided adhesive tape 20 had an adhesive force of 3.93 N/10 mm. The double-sided adhesive tape 21 had an adhesive force of 6.30 N/10 mm.

[Measurement of Total Light Transmittance]

Total light transmittance was measured according to the measurement method described above. A hazemeter NDH2000 manufactured by Nippon Denshoku Industries Co., Ltd. was used. A standard illuminant D65 defined by International Commission on Illumination (CIE) was used for the measurement.

[90° Peeling Test]

The single-sided tape was adhered to the surface of an electrocatalyst layer and a 90° peeling strength was measured by using a tensile testing machine. The peeling speed was 50 mm/min.

[Evaluation of Power Generation Performance]

Gas diffusion layers (SIGRACET (trademark) 35BC manufactured by SGL GE Holding GmbH (SHOWA DENKO CARBON Holding GmbH, currently)) were disposed on the outside of respective electrocatalyst layers and, for evaluation of power generation performance, a commercially available JARI standard cell was used. The cell temperature was set to 80° C. and hydrogen (100% RH) and air (100% RH) were respectively supplied to the anode and the cathode.

[Evaluation of Stability]

A cell unit of the same type as the cell unit used for evaluation of power generation performance was used for measurement and evaluation of durability. Then, a humidity cycling test described in "Cell Evaluation Analysis Protocol", a booklet published by New Energy and Industrial Technology Development Organization (NEDO), was performed until 5,000 humidity cycles elapsed. Then, the evaluation of power generation performance was performed.

[Catalyst-Layer Slurry 1]

20 g of platinum-carrying carbon (TEC10E50E manufactured by Tanaka Kikinzoku Kogyo) was placed in a container, and then water was added and mixed, followed by adding 1-propanol and an electrolyte (dispersion of Nafion (trademark) manufactured by Wako Pure Chemical Industries Co., Ltd. (FUJIFILM Waco Pure Chemical Corporation, currently)), further followed by stirring, thereby obtaining a catalyst-layer slurry 1.

[Catalyst-Layer Slurry 2]

20 g of platinum-carrying carbon (TEC10E50E manufactured by Tanaka Kikinzoku Kogyo) was placed in a container, and then water was added and mixed, followed by adding 1-propanol, an electrolyte (dispersion of Nafion (trademark) manufactured by Wako Pure Chemical Industries Co., Ltd. (FUJIFILM Waco Pure Chemical Corporation, currently) and 10 g of carbon nanofibers (VGCF (product name) manufactured by Showa Denko K.K. with a diameter of about 150 nm and a length of about 10 μm) as carbon fibers, further followed by stirring, thereby obtaining a catalyst-layer slurry 2.

[Catalyst-Layer Slurry 3]

20 g of platinum-carrying carbon (TEC10E50E manufactured by Tanaka Kikinzoku Kogyo) was placed in a container, and then water was added and mixed, followed by adding 1-propanol, an electrolyte (dispersion of Nafion (trademark) manufactured by Wako Pure Chemical Industries Co., Ltd. (FUJIFILM Waco Pure Chemical Corporation, currently) and 10 g of carbon nanofibers (with a diameter of about 1 nm and a length of about 1 μm) as carbon fibers, further followed by stirring, thereby obtaining a catalyst-layer slurry 3.

Example 1

The catalyst-layer slurry 1 was applied to polyethylene terephthalate substrates (termed PET substrates hereinafter) to form electrocatalyst layers. These electrocatalyst layers were transferred to a polymer electrolyte membrane (Nafion 212 manufactured by DuPont de Nemours, Inc.) by thermal pressing at 120° C. to obtain a membrane-electrode assembly of Example 1.

Example 2

The catalyst-layer slurry 2 was applied to PET substrates to form electrocatalyst layers. These electrocatalyst layers were transferred to a polymer electrolyte membrane (Nafion 212 manufactured by DuPont) by thermal pressing at 120° C. to obtain a membrane-electrode assembly of Example 2.

Example 3

The catalyst-layer slurry 2 was applied to a polymer electrolyte membrane (Nafion 212 manufactured by DuPont) by die coating, followed by drying at 80° C. in a furnace to obtain a membrane-electrode assembly of Example 3.

Example 4

The catalyst-layer slurry 3 was applied to a polymer electrolyte membrane (Nafion 212 manufactured by DuPont) by die coating, followed by drying at 80° C. in a furnace to obtain a membrane-electrode assembly of Example 4.

Comparative Example 1

The catalyst-layer slurry 1 was applied to PET substrates to form electrocatalyst layers. These electrocatalyst layers were transferred to a polymer electrolyte membrane (Nafion 212 manufactured by DuPont) by thermal pressing at 90° C. to obtain a membrane-electrode assembly of Comparative Example 1.

Comparative Example 2

The catalyst-layer slurry 1 was applied to PET substrates to form electrocatalyst layers. These electrocatalyst layers were transferred to a polymer electrolyte membrane (Nafion 212 manufactured by DuPont) by thermal pressing at 70° C. to obtain a membrane-electrode assembly of Comparative Example 2.

Results

The total light transmittance and 90° peeling strength of the membrane-electrode assemblies of Examples 1 to 3 and Comparative Examples 1 and 2 were measured as described above. Polymer electrolyte fuel cells respectively including the membrane-electrode assemblies of Examples 1 to 3 and Comparative Examples 1 and 2 were prepared and the power generation performance of these fuel cells was measured as described above. The results are shown in Table 1.

TABLE 1

|  | Total light transmittance | 90° peeling strength | Power generation performance | Stability |
|---|---|---|---|---|
| Example 1 | Good | Good | Good | Good |
| Example 2 | Good | Good | Good | Good |
| Example 3 | Good | Good | Good | Good |
| Example 4 | Good | Good | Good | Good |
| Comparative Example 1 | Poor | Good | Good | Poor |
| Comparative Example 2 | Poor | Good | Poor | Poor |

In table 1, a total light transmittance of 40% or less was indicated with "Good", otherwise, the total light transmittance was indicated with "Poor". In table 1, a 90° peeling strength of 0.1 N/cm or more was indicated with "Good", otherwise, the 90° peeling strength was indicated with "Poor". In table 1, a power generation performance at a current density of 1.0 A/cm2 with a voltage of 0.6 V or more was indicated with "Good", and with a voltage of less than 0.6 V was indicated with "Poor". For stability evaluation, the power generation performance after the cycling test was evaluated according to the same criteria as above.

It will be understood from Table 1 that a polymer electrolyte fuel cell having high power generation performance and good stability can be obtained by using a membrane-electrode assembly in which the total light transmittance is 40% or less at the electrocatalyst layer located part after delamination of the electrocatalyst layers from both surfaces by using an adhesive tape.

REFERENCE SIGNS LIST

1 . . . Polymer electrolyte membrane; 2 . . . Electrocatalyst layer; 3 . . . Electrocatalyst layer; 4 . . . Air electrode-side gas diffusion layer; 5 . . . Fuel electrode-side gas diffusion layer; 6 . . . Air electrode; 7 . . . Fuel electrode; 8 . . . Gas passage; 9 . . . Cooling water passage; 10 . . . Separator; 11 . . . Polymer electrolyte fuel cell; 12 . . . Membrane-electrode assembly; 13 . . . Catalyst particle; 14 . . . Carbon particle; 15 . . . Polymer electrolyte; 16 . . . Carbon fiber; 17 . . . Electrocatalyst layer non-located part; 18 . . . Electrocatalyst layer located part; 20 . . . Single-sided adhesive tape; 21 . . . Double-sided adhesive tape; 30 . . . Fixing base

What is claimed is:

1. A membrane-electrode assembly, comprising:
a polymer electrolyte membrane having a first surface and a second surface opposite to the first surface, and,
a first electrocatalyst layer in direct contact with the first surface of the polymer electrolyte membrane, and
a second electrocatalyst layer in direct contact with the second surface of the polymer electrolyte membrane;
wherein:
a total light transmittance measured after delamination of both the first and second electrocatalyst layers by using an adhesive member is 40% or less;
the total light transmittance is a total light transmittance at a part where the electrocatalyst layers are located, when a total light transmittance at a part other than the part where the first and the second electrocatalyst layers are located is taken to be 100%; and
the adhesive member has an adhesive force of 3 N/10 mm or more when measured by pulling the adhesive member adhered to a stainless steel in a 180° angle direction relative to the stainless steel, for delamination from the stainless steel.

2. The membrane-electrode assembly of claim 1, wherein each of the first and second electrocatalyst layers comprises catalyst particles, carbon particles, a polymer electrolyte and carbon fibers.

3. The membrane-electrode assembly of to claim 2, wherein the carbon fibers contain at least one of carbon nanotubes and carbon nanofibers.

4. A polymer electrolyte fuel cell comprising the membrane-electrode assembly of claim 1.

* * * * *